W. W. STEPHENS.
BELT CONVEYER.
APPLICATION FILED JULY 26, 1915. RENEWED NOV. 12, 1917.

1,255,659.

Patented Feb. 5, 1918.

Inventor:
Wiley W. Stephens
By Gilson Gilson
Attys.

UNITED STATES PATENT OFFICE.

WILEY W. STEPHENS, OF AURORA, ILLINOIS, ASSIGNOR TO STEPHEN-ADAMSON MFG. CO., A CORPORATION OF ILLINOIS.

BELT CONVEYER.

1,255,659.  Specification of Letters Patent.  Patented Feb. 5, 1918.

Application filed July 26, 1915, Serial No. 42,030. Renewed November 12, 1917. Serial No. 201,659.

*To all whom it may concern:*

Be it known that I, WILEY W. STEPHENS, a citizen of the United States, and resident of Aurora, county of Kane, and State of Illinois, have invented certain new and useful Improvements in Belt Conveyers, of which the following is a specification, and which are illustrated in the accompanying drawings, forming a part thereof.

The invention relates to belt conveyers and contemplates a construction in which the belt carriers are formed by the connection of a plurality of similar sections or units each comprising a pulley or roller and a holder therefor. The object of the invention is accordingly to provide a belt conveyer in which the belt carriers are of inexpensive but effective construction and may be varied in form or size by the rearrangement of the sections from which they are composed or by the addition or removal of sections.

In the accompanying drawings.

Figure 1:
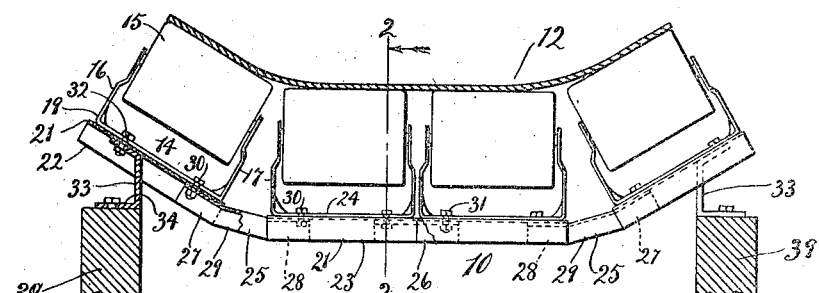
Figure 1 is a detail transverse sectional view showing one form of belt conveyer embodying the features of improvement provided by the invention.

The drawings illustrate the application of the invention to the construction of two forms of belt carriers generally designated 10 and 11, respectively. Carriers of either of the forms may be used for supporting a conveyer belt, as 12 or 13, at intervals throughout the upper or load carrying length of the belt. In either case the belt is troughed or curved to increase its holding capacity. Each of the carriers 10 and 11 is formed by the connection of a plurality of like units or sections 14, each comprising a relatively short pulley or roller 15. The number of sections or units 14 employed in each carrier is preferably sufficient to provide rollers 15 for engaging the under side of the belt 12 or 13 throughout substantially the entire width of the same.

The roller 15 of each of the sections 14 is rotatably supported between the arms, as 16, 17, of a U-shaped bracket 19. For this purpose a spindle 20 may be employed for rigidly connecting the two arms 16, 17, of the bracket 19 and the roller 15 is rotatably mounted on the spindle, all as more fully shown in my application for patent on pulley which is filed concurrently with this application. For strengthening the brackets 19 and to facilitate the connection of the several sections 14 in various ways, a channeled base plate 21, having downturned flanges 22, 23, is bolted against the under side of the cross member 24 of the bracket.

Figures 2, 4, 5:
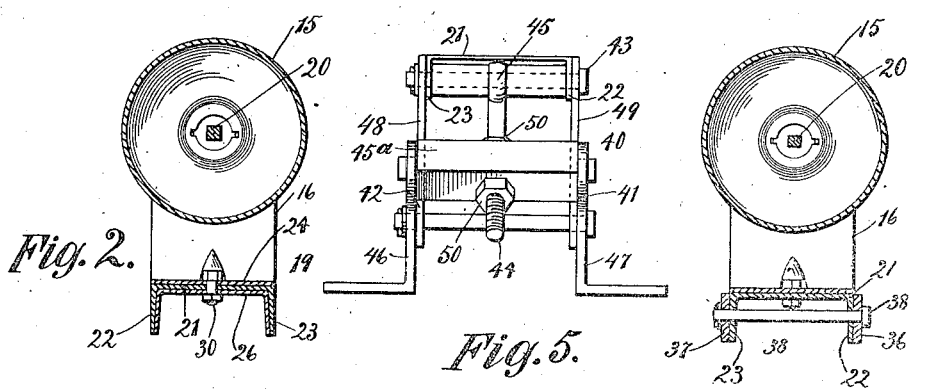
Fig. 2 is a detail sectional view taken on the line 2—2 of Fig. 1.
Fig. 4 is a detailed sectional view taken on the line 4—4 of Fig. 3.
Fig. 5 is a detail end view of the carrier illustrated in Fig. 3.

In the form of construction illustrated in Figs. 1 and 2 the several sections or units 14 are rigidly connected end to end with the outer units 14 oppositely inclined and the intermediate units occupying a horizontal position. For this purpose, channeled connecting plates 25, 26, are employed. Each of these connecting plates is preferably of such width and depth as to permit of its opposite end portions being fitted against the under side of base plates 21 of the adjacent sections 14, between the flanges 22, 23. When the carrier is composed of four of the sections 14, as shown in Fig. 1, two of the connecting plates, as 25, 26, have oppositely inclined end portions 27, 28, and an intermediate straight portion 29, while the remaining connecting plate 26 is made straight throughout its length. In this instance, the end portions 27, 28, of each of the connecting plates 25 is fitted within the channels of the base plates 21 of two adjacent sections 14 and they may be rigidly united therewith by the use of the same bolts, as 30, which serve for connecting the base plates 21 with the cross members 24 of the corresponding brackets 19. Similarly the channeled base plates 21 of the two intermediate sections 14 are fitted over the opposite end portions of the connecting plate 26 and are rigidly connected thereto by the use of the same bolts, as 31, which serve for uniting the adjacent ends of the base plates 21 with the corresponding brackets 19.

In using the construction just described, a fixed support, as 32, is provided adjacent each side of the belt 12 and each of the outer sections 14 is rigidly mounted upon one of these supports. As shown, a bracket 33 is provided at each side. Each of these brackets may be formed with a horizontal bottom flange 34 for engaging the top of the corresponding support 32 and an inclined upper flange 35 which is bolted against the under side of the base plate 21 of the adjacent section 14. The width of the complete carrier 10 is determined by the number of sections 14 employed in its construction and the relative arrangement of these sections is determined by the form of the connecting plates 25 and 26. It accordingly follows that a selected number of identical sections or units 14 may be employed for the construction of belt carriers of various widths and forms.

Figure 3:
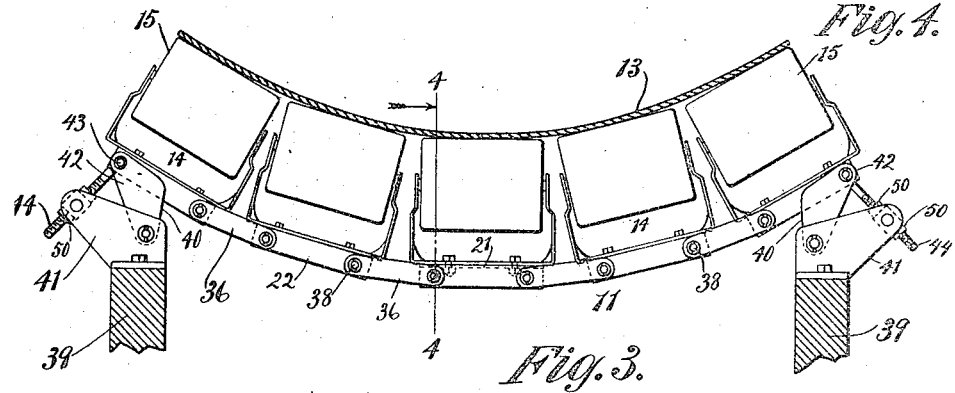
Fig. 3 is similar to Fig. 1 but shows a modified form of belt carrier.

In the arrangement illustrated in Figs. 3, 4 and 5, the carrier 11, is constructed by flexibly connecting a number of the sections 14. For this purpose links 36, 37, are extended between adjacent sections 14 at opposite sides. These links are pivotally united with the adjacent sections, as by means of bolts 38 which, as shown, pass through the depending flanges 22, 23 of the corresponding base plate 21 and through both of the links 36 and 37.

The carrier 11 serves for troughing the belt 13 upon a substantially continuous curve. If desired, provision may be made for varying the depth of this curve. As shown, a fixed support 39 is provided at each side of the belt 13 and an adjustable bracket 40 is mounted upon each of the supports 39. Preferably each bracket 40 is composed of a pair of pivotally connected sections 41, 42, and each section comprises a pair of laterally separated side plates, as 46, 47, and 48, 49. The side plates 46, 47 of the section 41 are bolted upon the corresponding support 39. The side plates 48, 49, of the section 42, on the other hand are each pivotally connected with one of the flanges 22, 23, of the base plate 21 of the adjacent carrier section 14. For this purpose a single pivot bolt 43 is preferably extended through both the said side plates and flanges.

The adjustment of the carrier 11 is accomplished by swinging the sections 42 of the supporting brackets 40 at each side. To this end a screw bolt 44 is employed for connecting the two sections 41, 42, of each bracket. As shown, each bolt 44 is formed with an eye 45 at one end for engaging the corresponding pivot bolt 43. The other end of each bolt 44 is threaded and provided with nuts 50 which engage a cross member 45ª, of the bracket section 41 upon opposite sides. As in the form of construction illustrated in Figs. 1 and 2, the width of the carrier 11 is determined by the number of sections 14 employed in its construction. It follows that if at any time it is desired to increase the capacity of the belt conveyer the carriers 10 or 11, may be readily modified to support wider belts by the introduction of additional sections 14.

I claim as my invention,—

1. A conveyer comprising, in combination, a belt, a pair of fixed supports, one at each side of the belt, a plurality of belt engaging rollers having their axes in a common plane which is transverse to the belt, a plurality of like separate U-shaped brackets, the arms of each bracket embracing and rotatably supporting one of the rollers, means connecting the cross member of the outer bracket at each side of the belt to the corresponding one of the said fixed supports and means, other than the last named connecting means, uniting the cross members of adjacent brackets.

2. A conveyer comprising, in combination, a belt, a plurality of belt engaging rollers having their axes in a common plane which is transverse to the belt, a plurality of like separate U-shaped brackets, the arms of each bracket embracing and rotatably supporting one of the rollers, a fixed support at each side of the belt, adjustable means connecting the outer bracket at each side of the belt with the corresponding fixed support, and flexible connection between each two adjacent brackets.

3. A conveyer comprising, in combination, a belt, a plurality of belt engaging rollers having their axes in a common plane which is transverse to the belt, a separate holder for each roller, a support for the outer holder at each side of the belt, and a plurality of separate intermediate plates each connecting the holders of two adjacent rollers.

4. A conveyer comprising, in combination, a belt, a pair of fixed supports, one at each side of the belt, a plurality of belt engaging rollers having their axes in a common plane which is transverse to the belt, a plurality of like separate U-shaped brackets each having a channeled base with a depending flange at each side and arms embracing and rotatably supporting one of the rollers, means connecting the base of the outer bracket at each side of the belt to the corresponding one of the said fixed supports and a plurality of separate pairs of upright plates, the plates of each pair lying against and connecting the base flanges of two adjacent brackets.

WILEY W. STEPHENS.